United States Patent
Li et al.

(10) Patent No.: US 11,722,490 B1
(45) Date of Patent: Aug. 8, 2023

(54) DATA ACCESS PROCESSING METHOD FOR INDUSTRIAL INTERNET CLOUD SERVICE PLATFORM

(71) Applicant: Chengdu University of Information Technology, Chengdu (CN)

(72) Inventors: Binyong Li, Chengdu (CN); Xianhui Deng, Chengdu (CN); Fan Yang, Chengdu (CN); Shaowei Zhang, Chengdu (CN); Liangming Deng, Chengdu (CN); Jie Zhang, Chengdu (CN)

(73) Assignee: Chengdu University of Information Technology, Chengdu (CN)

( * ) Notice: Subject to any disclaimer, the term of this patent is extended or adjusted under 35 U.S.C. 154(b) by 0 days.

(21) Appl. No.: 18/115,013

(22) Filed: Feb. 28, 2023

(30) Foreign Application Priority Data

Jul. 11, 2022 (CN) .......................... 202210808225.4

(51) Int. Cl.
*H04L 9/40* (2022.01)
*H04L 67/1097* (2022.01)
*H04L 67/12* (2022.01)
*G06F 21/60* (2013.01)
*G06F 21/62* (2013.01)

(52) U.S. Cl.
CPC ............ *H04L 63/10* (2013.01); *G06F 21/606* (2013.01); *G06F 21/6218* (2013.01); *H04L 67/1097* (2013.01); *H04L 67/12* (2013.01); *G06F 2221/2141* (2013.01); *H04L 2209/60* (2013.01)

(58) Field of Classification Search
CPC ...... H04L 63/10; H04L 67/12; G06F 21/6218
See application file for complete search history.

(56) References Cited

PUBLICATIONS

Junzhou Luo, et al., The architecture and key technologies for an industrial Internet with synergy between the cloud and clients, Scientia Sinica Informationis, pp. 195-220, vol. 50, Science China Press.

*Primary Examiner* — Jason Chiang
(74) *Attorney, Agent, or Firm* — Bayramoglu Law Offices, LLC

(57) ABSTRACT

A data access processing method for an industrial Internet cloud service platform, comprising an industrial device with data to be accessed transmits a data access request to a data processing unit of the platform, and meanwhile uploads a device identifier capable of identifying the industrial device with data to be accessed, the data processing unit retrieves a data upload authentication tag matching the data to be accessed from a traceability unit according to the data access request, and a corresponding access strategy is selected for processing according to the data upload authentication tag, device representation, and the data access request. The data to be accessed can be processed flexibly and intelligently according to requirements of a data owner and an actual operation condition of the platform; and during data processing, various resources of the platform can be well regulated and controlled to process the data to be accessed.

10 Claims, 4 Drawing Sheets

DATA ACCESS PROCESSING METHOD FOR INDUSTRIAL INTERNET CLOUD SERVICE PLATFORM

CROSS-REFERENCE OF THE RELATED APPLICATION

This application is based upon and claims priority to Chinese Patent Application No. 202210808225.4, filed on Jul. 11, 2022, the entire content of which is incorporated herein by reference.

TECHNICAL FIELD

The present disclosure relates to the technical field of the industrial Internet, and particularly relates to a data access processing method for an industrial Internet cloud service platform.

BACKGROUND

The industrial Internet is used for industrial production activities based on the Internet. Compared with the traditional Internet, the industrial Internet has higher requirements in network connectivity, real-time, security, etc., which aim to enable industrial production entities to work together efficiently. In addition, for intelligent manufacturing, the industrial Internet senses a production environment by means of the Internet of Things technology, and controls a production process by means of the big data technology. Compared with the traditional Internet of Things and big data technologies, the industrial Internet focuses on sensing and analysis of people, machines and things related to industrial production, and emphasizes self-organizing and self-adapting intelligent flexible production among entities. At present, academic and industrial circles have put forward an industrial Internet solution based on an "industrial cloud+terminal". It provides various services for industrial enterprises through a ubiquitous network with flexible and shareable resources and professional abilities as required, so as to achieve resource sharing and capability cooperation. In this "cloud separation" mode, an industrial cloud is responsible for all computing tasks, obtaining a decision result, and feeding it back to a controller, then the controller feeds it back to a terminal, and finally industrial control is completed. However, the "cloud separation" industrial Internet mode cannot ensure real-time, accurate and safe decision-making control of industrial production when facing requirements of thousands of users, ten thousand terminals, complex industrial scenario sensing, terabyte-level data second-level processing, and millisecond-level industrial control delay. Therefore, an industrial Internet solution based on "cloud convergence" has been put forward. A "cloud convergence" industrial Internet is a new mode of the industrial Internet, which can achieve networked, intelligent and flexible industrial production by comprehensively and deeply sensing characteristics and states of production entities during industrial manufacturing, dynamically/online exchanging, computing and distributing data between the industrial cloud (cloud) and the production entities (terminals), and then efficiently, seamlessly and transparently using computing, storage, network, platform, data and user resources of industrial Internet platforms and terminals together. Therefore, compared with a traditional industrial Internet mode, the industrial Internet mode based on "cloud convergence" can achieve high-level cooperation, deep function integration and intelligent open sharing between the industrial cloud and the production entities, thus ensuring real-time, accurate and safe decision-making and control of industrial production, and supporting upper-level applications.

An industrial Internet cloud service platform is an extension of a traditional industrial cloud, an important carrier of industrial Internet applications, and a hub of industrial all-factor links. Therefore, construction quality of the industrial Internet cloud platform determines whether the industrial Internet can exert its own efficiency. To sum up, compared with an industrial Internet cloud service platform (called an "old industrial cloud service platform" hereinafter) based on the traditional "cloud separation" industrial Internet mode, an industrial Internet cloud service platform (called a "new industrial cloud service platform" hereinafter) based on the "cloud convergence" industrial Internet mode can achieve more real-time and accurate data processing, as well as intelligence and flexibility of data processing, analysis, decision-making and feedback control. However, at present, the research on the new industrial cloud service platform is merely in an initial stage, which not only lacks architecture and key technologies that match features of the industrial Internet, but cannot satisfy requirements in future production, such as "more complex sensing objects, more diversified networking entities, more multidimensional data processing, and more intelligent feedback control". For example, when all kinds of industrial devices that have entered the industrial cloud service platform want to upload their own industrial production data to the platform, they often need to use the industrial cloud service platform to process such data. When processing this kind of data, the industrial cloud service platform needs to have strong computing capability and capability of "processing on demand". Therefore, if an industrial cloud service platform merely has single data computing capability or a single means of data computing, it will not only fail to ensure that such data can be processed safely and conveniently, but also fail to satisfy the demand of data owners for "processing on demand".

In conclusion, when authenticating all kinds of industrial devices to be connected to the platform, the new industrial cloud service platform has problems as follows:

When data to be accessed by various industrial devices entering the new industrial cloud service platform is processed, the means of processing data is relatively single;

the data to be accessed cannot be processed flexibly and intelligently according to requirements of the data owners and an actual operation condition of the platform;

during data processing, various resources of the platform cannot be well regulated and controlled to process the data to be accessed; and each device in the platform has weak secure cooperation capability and intelligent cooperation capability, which can easily cause low efficiency and failure to satisfy established requirements of data processing when a terminal device having weak computing capability processes or computes corresponding industrial production data, and thus influencing normal production activities of the platform.

SUMMARY

The present disclosure provides a data access processing method for an industrial Internet cloud service platform, so as to solve problems in the background art.

A specific technical solution of the present disclosure is as follows:

A data access processing method for an industrial Internet cloud service platform includes:

step 1, transmitting, by an industrial device with data to be accessed, a data access request to a data processing unit of the platform, and meanwhile uploading a device identifier capable of identifying the industrial device with data to be accessed;

step 2, retrieving, by the data processing unit, a data upload authentication tag matching the data to be accessed from a traceability unit according to the data access request; under the condition that the data upload authentication tag is successfully retrieved, proceeding to step 3; and otherwise, rejecting, by the data processing unit, a current data access request of the industrial device with data to be accessed, and then completing current data access processing;

step 3, determining, by the data processing unit, validity of the data upload authentication tag according to a tag check code in the data upload authentication tag; under the condition that the data upload authentication tag is valid, proceeding to step 4; and otherwise, rejecting, by the data processing unit, the current data access request of the industrial device with data to be accessed, meanwhile, deleting the data upload authentication tag from the traceability unit, and then completing the current data access processing;

step 4, obtaining, by the data processing unit, a data processing code and an access control identifier of the data to be accessed from the data upload authentication tag; under the condition that the data processing code is NRP and the access control identifier is NULL or GEN, proceeding to step 5; and otherwise, proceeding to step 7;

step 5, under the condition that the access control identifier is GEN, proceeding to step 6; and otherwise, directly accessing, by the industrial device with data to be accessed, the data to be accessed according to a data storage address in the data upload authentication tag, and then completing the current data access processing;

step 6, obtaining, by the data processing unit, an access strategy for the data to be accessed from an access strategy retrieving address bit of the data upload authentication tag, then operating an attribute-based access control function, and determining whether the industrial device with data to be accessed has authority to access the data to be accessed according to the access strategy; under the condition that the industrial device with data to be accessed has access authority, accessing, by the industrial device with data to be accessed, the data to be accessed according to the access authority and the data storage address of the data to be accessed, and completing the current data access processing; and otherwise, rejecting, by the data processing unit, the current data access request of the industrial device with data to be accessed, and then completing the current data access processing;

step 7, recommending, by a sensor network of the platform, an optimal data access processing solution suitable for the industrial device with data to be accessed to the data processing unit according to the device identifier, the data upload authentication tag, and a current actual operation condition of the platform;

step 8, determining, by the data processing unit, an implementation monitoring object for monitoring implementation of a current data access processing task according to the optimal data access processing solution; under the condition that the implementation monitoring object is the data processing unit, proceeding to step 9; and otherwise, proceeding to step 11;

step 9, assisting, by the data processing unit, the industrial device with data to be accessed to install a secure communication algorithm according to the optimal data access processing solution, and after installation is completed, establishing a temporary secure channel of the industrial device with data to be accessed according to the algorithm;

step 10, obtaining, by the data processing unit, the data to be accessed and the access strategy from a storage unit of the platform and an access control module of the data processing unit according to a data storage address bit and the access strategy retrieving address bit of the data upload authentication tag, respectively; then decrypting, by the data processing unit, the data to be accessed according to the optimal data access processing solution and the access strategy; under the condition that decryption of the data to be accessed fails, determining that the industrial device with data to be accessed has no access authority, rejecting, by the data processing unit, the current data access request of the industrial device with data to be accessed, closing the temporary secure channel, and then completing the current data access processing; and otherwise, transmitting, by the data processing unit, decrypted data to the industrial device with data to be accessed via the temporary secure channel, closing the temporary secure channel, and then completing the current data access processing;

step 11, under the condition that the implementation monitoring object is the industrial device with data to be accessed, proceeding to step 12; and otherwise, proceeding to step 15;

step 12, assisting, by the data processing unit, the industrial device with data to be accessed to install the secure communication algorithm according to the optimal data access processing solution, and after installation is completed, establishing the temporary secure channel of the industrial device with data to be accessed according to the algorithm;

step 13, based on the optimal data access processing solution, assisting, by the data processing unit, the industrial device with data to be accessed to install a decryption facility suitable for the data to be accessed by means of the temporary secure channel; and then obtaining, by the data processing unit, the data to be accessed and the access strategy from the storage unit and the access control module of the data processing unit according to the data storage address bit and the access strategy retrieving address bit of the data upload authentication tag, respectively, and then transmitting the data to be accessed and the access strategy to the industrial device with data to be accessed via the temporary secure channel;

step 14, decrypting, by the industrial device with data to be accessed, the data to be accessed by means of the decryption facility; under the condition that the industrial device with data to be accessed successfully decrypts the data to be accessed, determining, by the data processing unit, that the industrial device with data to be accessed successfully accesses data, closing the temporary secure channel, and then completing the current data access processing; and otherwise, determining that the industrial device with data to be accessed has no access authority, meanwhile, rejecting, by the data processing unit, the current data access request of the industrial device with data to be accessed, closing the temporary secure channel, and then completing the current data access processing;

step 15, selecting, by the data processing unit, qualified devices to form a cooperative computing device group according to the optimal data access processing solution and a specific condition of the industrial device in a device terminal candidate pool; and after the cooperative computing device group is successfully formed, assisting, by the data processing unit, the cooperative computing device group and the industrial device with data to be accessed to install the secure communication algorithm according to an optimal data processing solution, and after installation is completed, establishing the temporary secure channel of the cooperative computing device group and the industrial device with data to be accessed according to the algorithm;

step 16, based on the optimal data access processing solution, assisting, by the data processing unit, the cooperative computing device group to install the decryption facility suitable for the data to be accessed by means of the temporary secure channel; and then obtaining, by the data processing unit, the data to be accessed and the access strategy from the storage unit and the access control module of the data processing unit according to the data storage address bit and the access strategy retrieving address bit of the data upload authentication tag, respectively, and then transmitting the data to be accessed and the access strategy to the cooperative computing device group via the temporary secure channel; and step 17, decrypting, by the cooperative computing device group, the data to be accessed by means of the decryption facility according to the access strategy; under the condition that the cooperative computing device group successfully decrypts the data to be accessed, transmitting, by the cooperative computing device group, the decrypted data to the industrial device with data to be accessed via the temporary secure channel, specifically, determining, by the data processing unit, that the industrial device with data to be accessed successfully accesses data, closing the temporary secure channel, dismissing the cooperative computing device group, and then completing the current data access processing; and otherwise, determining that the industrial device with data to be accessed has no access authority, specifically, rejecting, by the data processing unit, the current data access request of the industrial device with data to be accessed, closing the temporary secure channel, dismissing the cooperative computing device group, and then completing the current data access processing.

According to the present application, there are various means of processing data; the data to be accessed may be processed flexibly and intelligently according to requirements of a data owner and the actual operation condition of the platform; during data processing, various resources of the platform may be well regulated and controlled to process the data to be accessed; and each device in the platform has strong secure cooperation capability and intelligent cooperation capability, so as to avoid low efficiency and failure to satisfy established requirements of data processing when a terminal device having weak computing capability processes or computes corresponding industrial production data, and ensure normal production activities of the platform.

BRIEF DESCRIPTION OF THE DRAWINGS

In order to more clearly illustrate particular embodiments of the present disclosure or technical solutions in the prior art, a brief introduction to the accompanying drawings required for the description of the specific embodiments or the prior art will be provided below. In all the drawings, similar elements or parts are generally identified by similar reference numerals. In the drawings, the elements or parts are not necessarily drawn to actual scale.

DETAILED DESCRIPTION OF THE EMBODIMENTS

The technical solutions in examples of the present disclosure will be clearly and completely described below. Apparently, the described examples are merely some examples rather than all examples of the present disclosure. All the other examples obtained by those of ordinary skill in the art based on the examples in the present disclosure without making creative efforts shall fall within the protection scope of the present disclosure.

For making objectives, technical solutions and advantages of the present disclosure clearer, the present disclosure will be described in further detail below in conjunction with the accompanying drawings and the examples. It should be understood that specific examples described herein are merely used to explain the present disclosure, and are not used to limit the present disclosure.

The present disclosure is further described below with reference to the accompanying drawings of the description.

Figure 1:
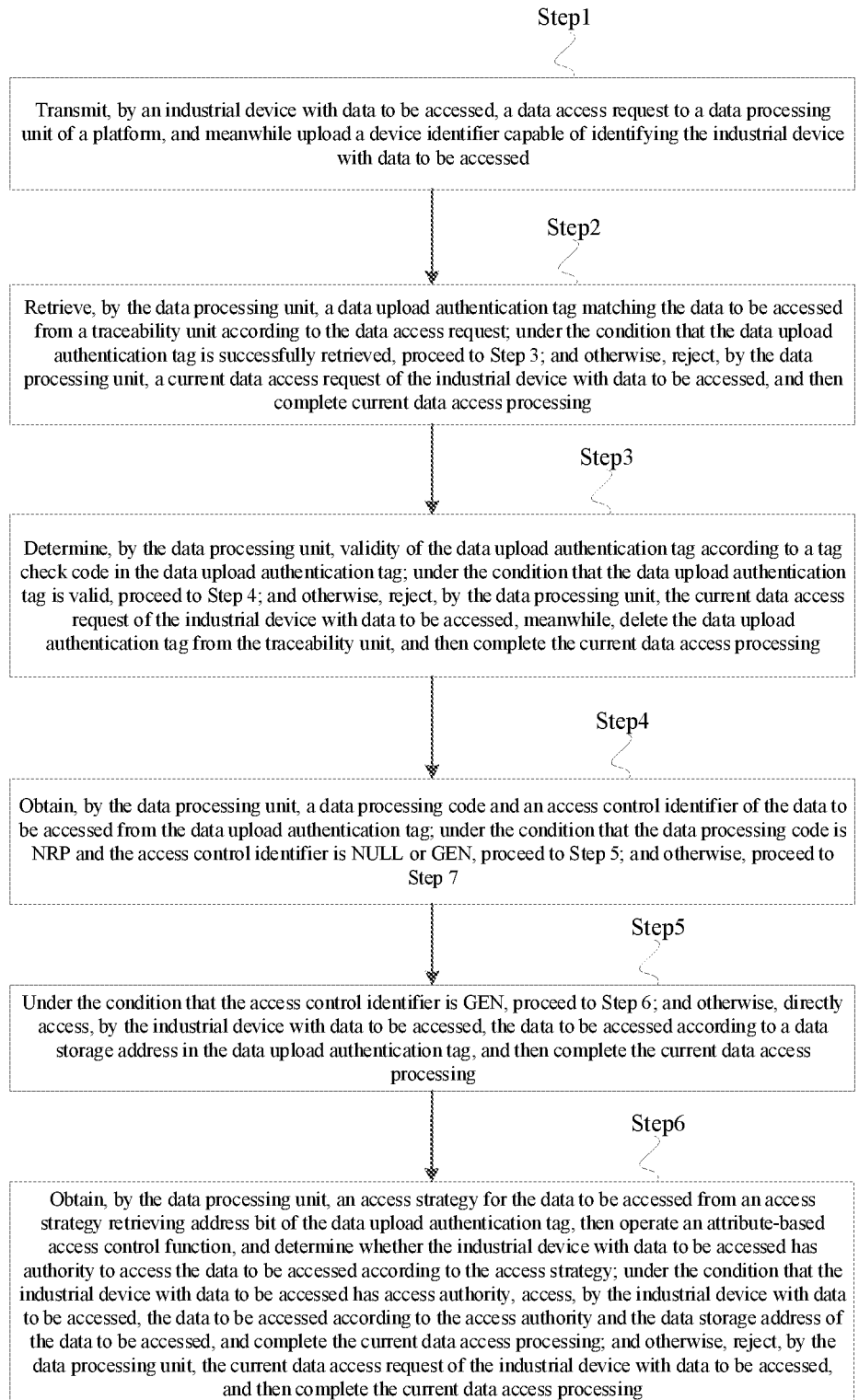
FIG. 1 shows part of a flow diagram of a data access processing method for an industrial Internet cloud service platform according to an example of the present disclosure.
Figure 2:
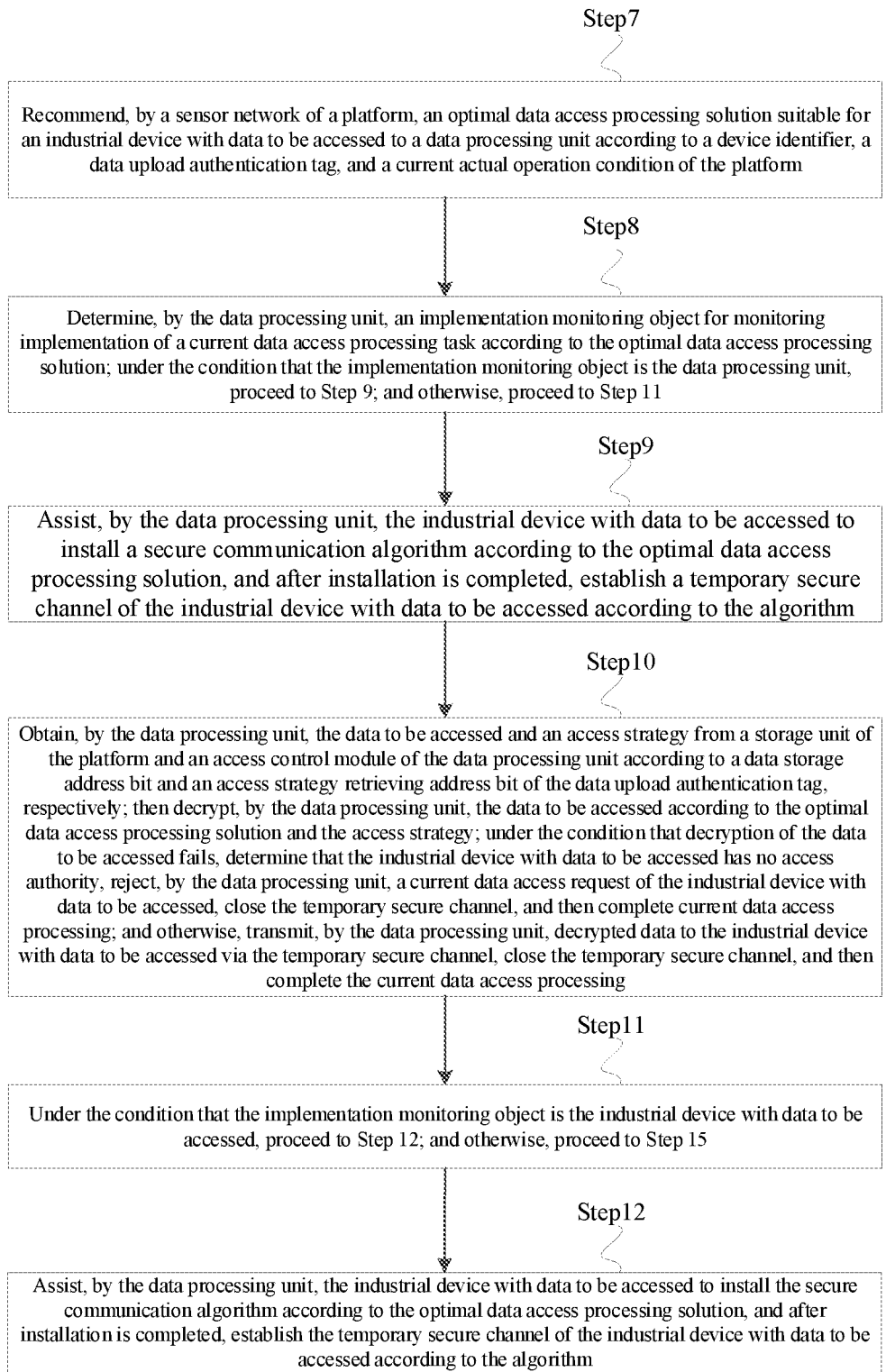
FIG. 2 shows part of a flow diagram of a data access processing method for an industrial Internet cloud service platform according to an example of the present disclosure.
Figure 3:
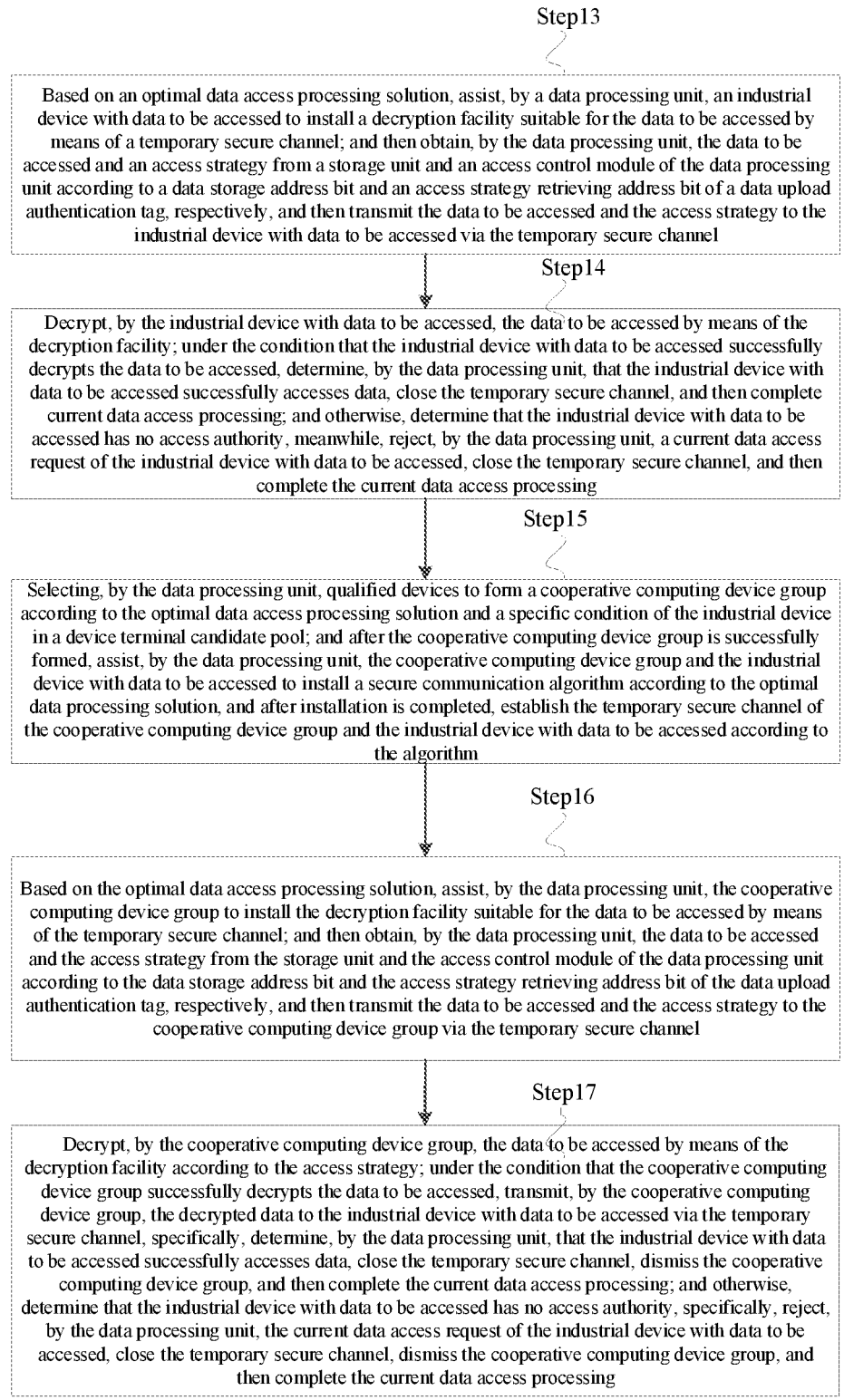
FIG. 3 shows part of a flow diagram of a data access processing method for an industrial Internet cloud service platform according to an example of the present disclosure.

As shown in FIGS. 1-3, an example of the present application provides a data access processing method for an industrial Internet cloud service platform. The method includes:

step 1, an industrial device with data to be accessed transmits a data access request to a data processing unit of the platform, and meanwhile a device identifier capable of identifying the industrial device with data to be accessed is uploaded.

step 2, the data processing unit retrieves a data upload authentication tag matching the data to be accessed from a traceability unit according to the data access request; under the condition that the data upload authentication tag is successfully retrieved, step 3 is proceeded to; and otherwise, the data processing unit rejects a current data access request of the industrial device with data to be accessed, and then current data access processing is completed.

step 3, the data processing unit determines validity of the data upload authentication tag according to a tag check code in the data upload authentication tag; under the condition that the data upload authentication tag is valid, step 4 is proceeded to; and otherwise, the data processing unit rejects the current data access request of the industrial device with data to be accessed, meanwhile, the data upload authentication tag is deleted from the traceability unit, and then the current data access processing is completed.

step 4, the data processing unit obtains a data processing code and an access control identifier of the data to be accessed from the data upload authentication tag; under the condition that the data processing code is NRP and the access control identifier is NULL or GEN, step 5 is proceeded to; and otherwise, step 7 is proceeded to.

step 5, under the condition that the access control identifier is GEN, step 6 is proceeded to; and otherwise, the industrial device with data to be accessed directly accesses the data to be accessed according to a data storage address in the data upload authentication tag, and then the current data access processing is completed.

step 6, the data processing unit obtains an access strategy for the data to be accessed from an access strategy retrieving address bit of the data upload authentication tag, then an attribute-based access control function is operated, and whether the industrial device with data to be accessed has authority to access the data to be accessed is determined according to the access strategy; under the condition that the industrial device with data to be accessed has access authority, the industrial device with data to be accessed accesses the data to be accessed according to the access authority and the data storage address of the data to be accessed, and the current data access processing is completed; and otherwise, the data processing unit rejects the current data access request of the industrial device with data to be accessed, and then the current data access processing is completed.

step 7, a sensor network of the platform recommends an optimal data access processing solution suitable for the industrial device with data to be accessed to the data processing unit according to the device identifier, the data upload authentication tag, and a current actual operation condition of the platform.

step 8, the data processing unit determines an implementation monitoring object for monitoring implementation of a current data access processing task according to the optimal data access processing solution; under the condition that the implementation monitoring object is the data processing unit, step 9 is proceeded to; and otherwise, step 11 is proceeded to.

step 9, the data processing unit assists the industrial device with data to be accessed to install a secure communication algorithm according to the optimal data access processing solution, and after installation is completed, a temporary secure channel of the industrial device with data to be accessed is established according to the algorithm.

step 10, the data processing unit obtains the data to be accessed and the access strategy from a storage unit of the platform and an access control module of the data processing unit according to a data storage address bit and the access strategy retrieving address bit of the data upload authentication tag, respectively; then the data processing unit decrypts the data to be accessed according to the optimal data access processing solution and the access strategy; under the condition that decryption of the data to be accessed fails, it is determined that the industrial device with data to be accessed has no access authority, the data processing unit rejects the current data access request of the industrial device with data to be accessed, the temporary secure channel is closed, and then the current data access processing is completed; and otherwise, the data processing unit transmits decrypted data to the industrial device with data to be accessed via the temporary secure channel, the temporary secure channel is closed, and then the current data access processing is completed.

step 11, under the condition that the implementation monitoring object is the industrial device with data to be accessed, step 12 is proceeded to; and otherwise, Step 15 is proceeded to.

step 12, the data processing unit assists the industrial device with data to be accessed to install the secure communication algorithm according to the optimal data access processing solution, and after installation is completed, the temporary secure channel of the industrial device with data to be accessed is established according to the algorithm.

step 13, based on the optimal data access processing solution, the data processing unit assists the industrial device with data to be accessed to install a decryption facility suitable for the data to be accessed by means of the temporary secure channel; and then the data processing unit obtains the data to be accessed and the access strategy from the storage unit and the access control module of the data processing unit according to the data storage address bit and the access strategy retrieving address bit of the data upload authentication tag, respectively, and then the data to be accessed and the access strategy are transmitted to the industrial device with data to be accessed via the temporary secure channel.

step 14, the industrial device with data to be accessed decrypts the data to be accessed by means of the decryption facility; under the condition that the industrial device with data to be accessed successfully decrypts the data to be accessed, the data processing unit determines that the industrial device with data to be accessed successfully accesses data, the temporary secure channel is closed, and then the current data access processing is completed; and otherwise, it is determined that the industrial device with data to be accessed has no access authority, meanwhile, the data processing unit rejects the current data access request of the industrial device with data to be accessed, the temporary secure channel is closed, and then the current data access processing is completed.

step 15, the data processing unit selects qualified devices to form a cooperative computing device group according to the optimal data access processing solution and a specific condition of the industrial device in a device terminal candidate pool; and after the cooperative computing device group is successfully formed, the data processing unit assists the cooperative computing device group and the industrial device with data to be accessed to install the secure communication algorithm according to an optimal data processing solution, and after installation is completed, the temporary secure channel of the cooperative computing device group and the industrial device with data to be accessed is established according to the algorithm.

step 16, based on the optimal data access processing solution, the data processing unit assists the cooperative computing device group to install the decryption facility suitable for the data to be accessed by means of the temporary secure channel; and then the data processing unit obtains the data to be accessed and the access strategy from the storage unit and the access control module of the data processing unit according to the data storage address bit and the access strategy retrieving address bit of the data upload authentication tag, respectively, and then the data to be accessed and the access strategy are transmitted to the cooperative computing device group via the temporary secure channel.

step 17, the cooperative computing device group decrypts the data to be accessed by means of the decryption facility according to the access strategy; under the condition that the cooperative computing device group successfully decrypts the data to be accessed, the cooperative computing device group transmits the decrypted data to the industrial device with data to be accessed via the temporary secure channel, specifically, the data processing unit determines that the industrial device with data to be accessed successfully accesses data, the temporary secure channel is closed, the cooperative computing device group is dismissed, and then the current data access processing is completed; and otherwise, it Is determined that the industrial device with data to be accessed has no access authority, specifically, the data processing unit rejects the current data access request of the industrial device with data to be accessed, the temporary secure channel is closed, the cooperative computing device group is dismissed, and then the current data access processing is completed.

In some examples, the platform is an industrial cloud service platform constructed by the industrial Internet on the basis of "cloud convergence" provided by the present application.

In some examples, the data processing unit is a data processing center specially responsible for regulating and controlling various computing resources and solution resources in the platform and conducting access control and processing on various data in the platform. The data processing unit further includes the access control module, a data processing module, and a data desensitization module. The access control module is responsible for operating various access control functions and storing the access strategy. The data processing module is responsible for conducting various processing on data or coordinating various computing resources and solution resources in the platform so as to process data. The data desensitization module is responsible for desensitizing all data to be uploaded that are uploaded to the data processing unit.

In some examples, the traceability unit is a ticket storage unit, in the platform, specially responsible for storing specific details of a historical data upload authentication tag and a historical optimal data upload solution.

In some examples, data parameter identifiers include a data identity (id), a data name, a data size, a data type, and a data source of the data to be uploaded, or other parameter sets that are capable of identifying the data to be uploaded without revealing various sensitive information.

In some examples, the device identifier is a reliable industrial device identifier that may be provided for the platform and is difficult to forge. Valid parameters of the device identifier include a device name, a device model, a device serial number, a device manufacturer, a production date, theoretical device computing capability, a device owner id, a device owner name, an actual specific device operation geographical position, etc.

In some examples, the data processing code is a data processing project implementation identifier, and valid parameters of the identifier include: NPR, EP, and EAP. The NPR identifies that before the data to be uploaded is uploaded to the storage unit of the platform, in addition to desensitization, no additional data processing operation needs to be conducted. The EP identifies that before the data to be uploaded is uploaded to the storage unit of the platform, desensitization needs to be conducted, then encryption needs to be conducted under guidance of an optimal data upload solution, and finally the data processing unit uploads encrypted data to the storage unit of the platform. The EAP identifies that before the data to be uploaded is uploaded to the storage unit of the platform, desensitization needs to be conducted, then arithmetic processing and encryption need to be conducted on the data to be uploaded according to a data uploading request and an optimal data upload processing solution, and finally the data processing unit uploads processed data to the storage unit of the platform.

In some examples, the sensor network is a data processing solution recommending unit that is based on a personalized recommendation technology of knowledge map embedding and may intelligently recommends the optimal data access processing solution suitable for the industrial device with data to be accessed to the data processing unit of the platform. In an early stage of construction, a data access processing module of the sensor network incorporates a large number of knowledge maps of data access processing solutions constructed manually on the basis of a knowledge mapping technology, and under the condition that the data processing solution recommending unit i epute er combined, a data access processing solution may be accurately recommended to the data processing unit according to the data access request, the device identifier, and the current actual operation condition of the platform; and meanwhile, data that is generated in a process of accessing the data to be accessed and may be used to update knowledge map structure data in the sensor network is also about to be updated to the sensor network in real time after access is completed, so as to ensure that the optimal data access processing solution recommended by the sensor network is more in line with a current actual data access scenario.

In some examples, the optimal data access processing solution is a more matching, more convenient and safer data access processing solution for the industrial device with data to be accessed, which is more in line with an actual data access scenario, and is recommended to the data processing unit by the sensor network according to the data access request, the device identifier, and the current actual operation condition of the platform. It should be noted that, firstly, the optimal data access processing solution is mainly used to guide the data processing module of the data processing unit to construct a data access processing solution suitable for the industrial device with data to be accessed; then, when the data access processing solution is constructed, reference is mainly made to the optimal data upload processing solution used when the data to be accessed is uploaded to the platform, and a data processing algorithm thereof, that is, according to the optimal data upload processing solution and the data processing algorithm thereof, the sensor network may quickly match a corresponding data processing solution (if the optimal data upload processing solution recommends that the data processing unit uses an encryption algorithm a, the sensor network will definitely recommend a decryption algorithm b matching the encryption algorithm a to the data processing unit according to the optimal data access processing solution), thus ensuring that the data to be accessed may be correctly, safely and validly accessed by the industrial device with data to be accessed after being correctly processed; then, when the implementation monitoring object of the data access processing solution is the data processing unit, the data processing unit operates the data processing algorithm for data access processing according to the optimal data access processing solution, thus ensuring that the data to be accessed may be accessed correctly, safely and validly; when the implementation monitoring object of the data access processing solution is the industrial device with data to be accessed, the data processing unit assists the industrial device with data to be accessed to install and operate the data processing algorithm for data access processing on the basis of the optimal data access processing solution, thus ensuring that the data to be accessed may be accessed correctly, safely and validly; but, when the implementation monitoring object of the data access processing solution is the cooperative computing device group, the data processing unit needs to configure the cooperative computing device group to install and operate the data processing algorithm for data access processing according to the optimal data access processing solution, thus ensuring that the data to be accessed may be accessed correctly, safely and validly while assisting the data processing unit in processing the data to be accessed.

In some examples, the cooperative computing device group is an industrial device set that is constructed by the data processing unit under the condition of satisfying the current actual operation condition of the platform and is used to assist the platform and the industrial device with data to be accessed to complete implementation of the optimal data access processing solution. The industrial device is a strong industrial device that is selected from the device terminal candidate pool of the platform by the sensor network on the basis of a current platform operation environment, a device condition of the industrial device with data to be uploaded, and content and difficulty of data upload processing, and the industrial device has certain computing capability, eputeation value reaching a threshold set by the platform, and relatively balanced load pressure, is located in a relatively safe and stable network environment, and is approved by an industrial device owner. The device terminal candidate pool is a device set storing industrial devices that may serve as devices in the cooperative computing device group and then provides services for the platform.

In some examples, the number of industrial devices in the cooperative computing device group may be one or more, and the actual number of devices may also be determined according to the optimal data upload processing solution. When a certain device in the cooperative computing device group is down or offline or has other faults, the data processing unit may re-configure rescue devices having the same capability as failed devices to join the cooperative computing device group according to the optimal data access processing solution and a current real-time operation condition in the cooperative computing device group, and may re-assign part of tasks originally configured for the failed devices to the rescue devices for implementation, thus ensuring that the optimal data access processing solution may be correctly executed. In addition, if a device in the cooperative computing device group needs to quit the platform, the device needs to complete currently unfinished tasks before quitting, and after a quitting application is submitted, the platform is about to immediately remove an industrial device to quit the platform from the device terminal candidate pool, and no longer assign tasks to the industrial device.

In some examples, the data upload authentication tag is a ticket certificate for recording basic information and processing details of the data to be uploaded. The data upload authentication tag is composed of a tag head and a data storage part.

Figure 4:
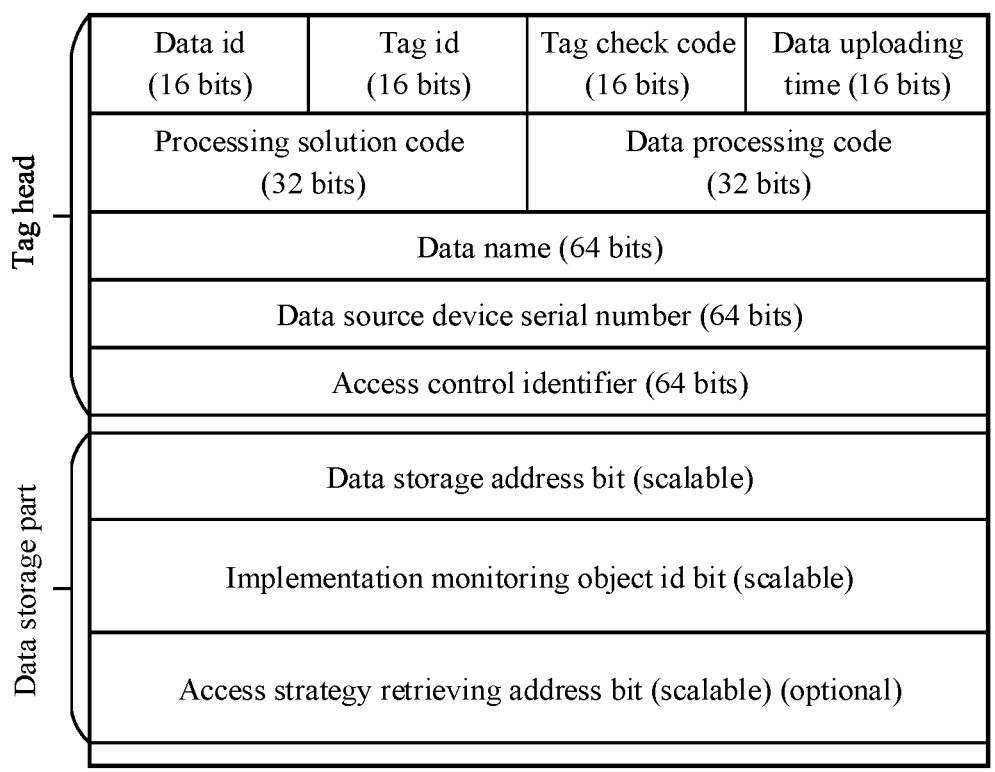
FIG. 4 shows a structure block diagram of a data upload authentication tag according to an example of the present disclosure.

Specifically, as shown in FIG. 4, the tag head is composed of a tag id of the data upload authentication tag (16 bits), a data id of the data to be uploaded (16 bits), a data name of the data to be uploaded (64 bits), a device serial number of a data source device of the data to be uploaded (64 bits), time of uploading the data to be uploaded to the platform (16 bits), the data processing code (32 bits), a processing solution id of the optimal data upload processing solution (32 bits), the access control identifier of the access control function used by the data to be uploaded (64 bits), and the tag check code of the data upload authentication tag (16 bits); and the data storage part is composed of a data storage address bit of a storage address for storing processed data to be uploaded in the storage unit (data bits are scalable), an implementation monitoring object id bit for storing an id of the implementation monitoring object (if the implementation monitoring object is the data processing unit, the id of the implementation monitoring object is represented as an identifier of the data processing unit: DPU; and otherwise, the id of the implementation monitoring object is represented as a device serial number of the industrial device) (data bits are scalable), and an access strategy retrieving address bit for storing a retrieving address of the access strategy in the access control module of the data processing unit (data bits are scalable) (optional). It should be noted that, firstly, the tag id of the data upload authentication tag is a number that uniquely identifies the data upload authentication tag, and the number is generated with a new data upload authentication tag before the data to be uploaded is uploaded to the storage unit; then, valid values of the access control identifier include NULL, GEN, and UNCON, where the NULL identifies that no access control function is used when the data to be uploaded is uploaded, that is, the data may be directly accessed, and an access object needs no access authority, and in this case, a filling value of the access strategy retrieving address bit is empty; the GEN identifies that when the data to be uploaded is uploaded, the data processing unit needs to generate an access strategy for the attribute-based access control function according to the data uploading request and an operation method of the attribute-based access control function, and the access strategy is uploaded to the access control module of the data processing unit for storage, then, when the data to be accessed is accessed, the access control module of the data processing unit needs to operate the attribute-based access control function to start the access control function, and then whether the access object has access authority is evaluated on the basis of the access strategy, and in this case, the access strategy retrieving address bit is filled with a retrieving address of the access strategy in the access control module of the data processing unit; and the UNCON identifies that when the data to be uploaded is uploaded, an access control function based on cryptography needs to be operated to achieve encryption and access control of the data to be uploaded at the same time, and in this case, the data processing unit needs to generate the access strategy according to the data uploading request and the access control function based on cryptography that is recommended in the optimal data upload solution and may be used for the current data uploading request, thus ensuring that when the data to be accessed is accessed, the data to be accessed may be decrypted according to the access strategy and under the condition that a correct access control function based on cryptography is operated, and then whether the access object has access authority may be determined according to a decryption result; in this case, the access strategy retrieving address bit is filled with the retrieving address of the access strategy in the access control module of the data processing unit; and most importantly, when the data processing code is NAP, a filling value of the access control identifier may be NULL or GEN instead of UNCON, and when the data processing code is EP or EAP, a filling value of the access control identifier may only be UNCON.

In some examples, the reputation value is a measurement value for measuring whether an industrial device in the device terminal candidate pool has reliability in a platform entering period, and is mainly obtained by comprehensively evaluating a contribution value, a device stability value and an evaluated index of the entering industrial device to the platform in the entering period. Assuming that a device serial number of a certain industrial device in the device terminal candidate pool is i, a computation formula of a reputation value Credibility_value$_i$ of the device i is:

$$\text{Credibility\_value}_i = \varphi_1 \times \text{Contribute}_i + \varphi_2 \times \text{Stability\_index}_i + \varphi_3 \times \text{DEI}_i$$

wherein Credibility_value$_i \in (0,1)$; $\varphi_1 \in (0,1)$, $\varphi_2 \in (0,1)$, and $\varphi_3 \in (0,1)$ are weight factors, and $\varphi_1+\varphi_2+\varphi_3=1$; contribute$_i$ indicates a contribution value of the device i to the platform in an entering period; Stability_index$_i$ indicates a device stability value of the device i in the entering period; and DEI$_i$ indicates an evaluated index of the device i in the entering period.

Specifically, the contribution value contribute$_i$ is mainly obtained by evaluating a condition that industrial production data uploaded by the device i in the entering period is accepted and used by other industrial devices or users in the platform, and a condition that the device serves as one of devices in an auxiliary computing device group or the cooperative computing device group in the entering period and assists the platform to implement a corresponding task. Therefore, a computation formula of the contribution value contribute$_i$ of the device i is:

$$\text{contribute}_i = \partial' \times \text{use}_i + \partial \times \text{cooperate}_i$$

wherein contribute$_i \in (0,1)$; use$_i$ in the contribute$_i$ indicates a condition that industrial production data uploaded by the device i is accepted and used by other industrial devices or users in the platform; cooperate$_i$ indicates a condition that the device i serves as one of devices in an auxiliary computing device group or the cooperative computing device group in the entering period and assists the platform to implement a corresponding task; and $\partial \in (0,1)$ and $\partial' \in (0,1)$ are weight factors, and $\partial + \partial' = 1$;

Specifically, a computation formula of use$_i$ in the contribute is:

$$\text{use}_i = \begin{cases} 0.5, & e=0 \\ (1-\alpha)\times 0.5 + \alpha \times \dfrac{\sum_{j=1}^{e}\text{score}_j}{e}, & 0<e<E \\ \dfrac{\sum_{j=1}^{e}\text{score}_j}{e}, & e>E \end{cases}$$

where use$_i \in (0,1)$; e in the use$_i$ indicates a total amount of industrial production data uploaded by the device i in the platform entering period; E is a quantity threshold and is mainly configured to prevent an industrial device having low trust and no trust from maliciously increasing the reputation value; score$_j \in [0,1]$ indicates a ratio of j th industrial production data that is accepted by other industrial devices or users and has successful application feedback to the industrial production data having the total amount e; and $\alpha \in (0,1)$ is a weight factor.

Specifically, a computation formula of cooperate$_i$ in the contribute$_i$ is:

$$\text{cooperate}_i = \begin{cases} 0.5 - (\text{total}_i - \text{success}_{totali})\times 0.01 & 0 \leq \text{success}_{totali} < ST \\ 0.5 \times \dfrac{\text{success}_{totali}}{\text{total}_i} + (\text{success}_{totali}\times 0.01) & ST \leq \text{success}_{totali} < ST_1 \\ \dfrac{\text{success}_{totali}}{\text{total}_i} & \text{success}_{totali} \geq ST_1 \end{cases}$$

wherein cooperate$_i \in (0,1]$; total$_i$ in the cooperate$_i$ indicates a total number of tasks that the device i serves as one of the devices in the auxiliary computing device group or cooperative computing device group to assist the platform to implement; success$_{totali}$ indicates the number of assistance tasks that the device i successfully completes; and ST and ST$_1$ are successful task quantity thresholds.

Specifically, the device stability index Stability_index$_i$ is an identity value for measuring whether the device i is capable of stable implementation when processing various services arranged by the platform, where the device stability index is mainly obtained by evaluating stability of a network environment where the device i is currently located in a large period of current reputation value evaluation, and a device health degree of the device i in the large period of current reputation value evaluation. Therefore, a computation formula of the device stability index Stability_index$_i$ of the device i is:

$$\text{Stability\_index}_i = \beta_1 \times NS_i + \beta_2 \times EH_i$$

wherein Stability_index$_i \in (0,1)$; $\beta_1 \in (0,1)$, $\beta_2 \in (0,1)$ is a weight factor, and $\beta_1+\beta_2=1$; $NS_i$ indicates stability of a network environment where the device i is currently located in a large period of current reputation value evaluation; and $EH_i$ indicates a device health degree of the device i in the large period of current reputation value evaluation; and Specifically, a computation formula of $NS_i$ is:

$$NS_i = \begin{cases} 1, & ++ \\ 0.8, & + \\ 0.5, & \pm \\ 0.3, & - \\ 0, & \text{down} \end{cases}$$

where "++" indicates that a network where the device i is currently located is in an environment having a short network delay, a low packet loss rate, small network jitter and no network attack in the large period of current reputation value evaluation, and in this case, $NS_i=1$; "+" indicates that a network environment where the device i is currently located has no network attack in the large period of current reputation value evaluation but has a certain degree of network jitter and packet loss, which does not influence normal industrial production activities of the device i in the platform, and in this case, $NS_i=0.8$; "±" indicates that the network environment where the device i is currently located has no network attack in the large period of current reputation value evaluation but has serious network jitter and packet loss at a plurality of time points, which further influences the normal industrial production activities of the device i in the platform to a certain extent, and in this case, $NS_i=0.5$; "−" indicates that the network environment where the device i is currently located has no network attack in the large period of current reputation value evaluation but has continuous and serious network jitter and packet loss in a plurality of time periods, which causes the device i to be incapable of conducting the normal industrial production activities in the platform, and in this case, $NS_i=0.3$; and "down" indicates that the device i suffers from network attacks in the large period of current reputation value evaluation, which further causes the device to be down and offline continuously or transmit malicious information endangering platform security to the platform so as to endanger the platform security, and in this case, $NS_i=0$. It should be noted that when $NS_i=0$, the device i is about to be removed from the device terminal candidate pool immediately, and in the entering period, the device i is no longer selected into the device terminal candidate pool.

Specifically, a value of $EH_i \in (0,1)$ is obtained through comprehensive evaluation of actual operation and guarantee conditions of the device i by an owner of the device i, and in the entering period, the owner of the device i needs to upload the value $EH_i$ regularly in an uploading cycle specified by the platform, and update an old value $EH_i$ in time; and under the condition that uploading is not conducted in time, $EH_i=0$ in a current stage of a large period of reputation value evaluation, and the $EH_i$ can only be updated in a next stage of the large period of reputation value evaluation.

Specifically, the evaluated index $DEI_i$ is an evaluation index computed and obtained according to direct evaluations by other industrial devices or users in the platform entering period of the device i, and its computation formula is:

$$DEI_i = \begin{cases} 0.5, & m = 0 \\ 0.5 + \dfrac{\sum_{k=1}^{m} dei_{i,j}^k}{m} \times \delta, & m < 0 < m' \\ \dfrac{\sum_{k=1}^{m} dei_{i,j}^k \times \gamma_k}{m}, & m \geq m' \end{cases}$$

where $DEI_i \in (0,1)$; m indicates the total number of evaluations by other industrial devices or users in the platform entering period of the device i; m' indicates a computation threshold, and is configured to prevent malicious, low-integrity and no-integrity industrial devices from colluding with other industrial devices or users to improve the evaluated index $DEI_i$ through sporadic high evaluation values; $I \in (0,1)$ indicates an evaluation given by the industrial device (user) j to the device i; $\delta$ is a growth limiting factor; and $\gamma_k$ indicates a trading time degradation factor, and its computation formula is:

$$\gamma_k = \frac{1}{m - k - 1}$$

Specifically, when the reputation value $Credibility\_value_i \geq 0.5$, it is indicated that the device i is at a normal reputation level; and when the reputation value $0.3 \leq Credibility\_value_i < 0.5$, it is indicated that the device i is at a low reputation level. In this case, the platform also reduces a probability of selecting the device i into the auxiliary computing device group or cooperative computing device group according to different reputation levels. Only when a reputation level of the device i is improved, the probability of selecting the device into the auxiliary computing device group or cooperative computing device group may be increased, and then reach a normal probability level. When the reputation value $Credibility\_value_i < 0.3$, it is indicated that the device i is at a non-reputation level. In this case, the platform may immediately remove the device i from the device terminal candidate pool, and the device i is no longer selected into the device terminal candidate pool in the entering period.

It should be noted that, firstly, a large evaluation period of the reputation value is an actual device maintenance period of the industrial device entering the platform, and is reported to the platform by an owner of the device when the device enters the platform, and meanwhile, a current actual operation and device maintenance condition of the device is reported, that is, $EH_i$; in this case, the platform may compute the large evaluation period of the reputation value of the device according to the actual device maintenance period uploaded by the owner of the device; and therefore, the device may be subjected to multiple reputation evaluations by the platform in the large evaluation period of the reputation value, but a value $EH_i$ of the device cannot change in the large evaluation period of the reputation value, only when the stage of the large evaluation period of the reputation value ends and the next stage of the large evaluation period of the reputation value is entered, the value $EH_i$ of the device may be updated according to the current actual operation and maintenance condition of the device reported by the owner of the device. Meanwhile, large evaluation periods of the reputation value of different devices may be different; and then, an evaluation object of the evaluated index $DEI_i$ has to be an industrial device or a user establishing a cooperative relation with an evaluated object.

The above examples are merely used to describe the technical solutions of the present disclosure, rather than limiting the same. Although the present disclosure has been described in detail with reference to the above examples, those of ordinary skill in the art should understand that the technical solutions described in the above examples can still be modified, or some or all of the technical features therein can be equivalently replaced. However, these modifications or substitutions do not make the essence of the corresponding technical solutions deviate from the scope of the technical solutions of each example of the present disclosure, but should be covered in the scope of the claims and the description of the present disclosure.

What is claimed is:

1. A data access processing method for an industrial Internet cloud service platform, comprising:

step 1, transmitting, by an industrial device with data to be accessed, a data access request to a data processing unit of the platform, and meanwhile uploading a device identifier capable of identifying the industrial device with data to be accessed;

step 2, retrieving, by the data processing unit, a data upload authentication tag matching the data to be accessed from a traceability unit according to the data access request; under the condition that the data upload authentication tag is successfully retrieved, proceeding to step 3; otherwise, rejecting, by the data processing unit, a current data access request of the industrial device with data to be accessed, and then completing current data access processing;

step 3, determining, by the data processing unit, validity of the data upload authentication tag according to a tag check code in the data upload authentication tag; under the condition that the data upload authentication tag is valid, proceeding to step 4; otherwise, rejecting, by the data processing unit, the current data access request of the industrial device with data to be accessed, meanwhile, deleting the data upload authentication tag from the traceability unit, and then completing the current data access processing;

step 4, obtaining, by the data processing unit, a data processing code and an access control identifier of the data to be accessed from the data upload authentication tag; under the condition that the data processing code is NRP and the access control identifier is NULL or GEN, proceeding to step 5; otherwise, proceeding to step 7;

step 5, under the condition that the access control identifier is GEN, proceeding to step 6; otherwise, directly accessing, by the industrial device with data to be accessed, the data to be accessed according to a data storage address in the data upload authentication tag, and then completing the current data access processing;

step 6, obtaining, by the data processing unit, an access strategy for the data to be accessed from an access strategy retrieving address bit of the data upload authentication tag, then operating an attribute-based access control function, and determining whether the industrial device with data to be accessed has authority to access the data to be accessed according to the access strategy; under the condition that the industrial device with data to be accessed has access authority, accessing, by the industrial device with data to be accessed, the data to be accessed according to the access authority and the data storage address of the data to be accessed, and completing the current data access processing; otherwise, rejecting, by the data processing unit, the current data access request of the industrial device with data to be accessed, and then completing the current data access processing;

step 7, recommending, by a sensor network of the platform, an optimal data access processing solution suitable for the industrial device with data to be accessed to the data processing unit according to the device identifier, the data upload authentication tag, and a current actual operation condition of the platform;

step 8, determining, by the data processing unit, an implementation monitoring object for monitoring implementation of a current data access processing task according to the optimal data access processing solution; under the condition that the implementation monitoring object is the data processing unit, proceeding to step 9; otherwise, proceeding to step 11;

step 9, assisting, by the data processing unit, the industrial device with data to be accessed to install a secure communication algorithm according to the optimal data access processing solution, and after installation is completed, establishing a temporary secure channel of the industrial device with data to be accessed according to the algorithm;

step 10, obtaining, by the data processing unit, the data to be accessed and the access strategy from a storage unit of the platform and an access control module of the data processing unit according to a data storage address bit and the access strategy retrieving address bit of the data upload authentication tag, respectively; then decrypting, by the data processing unit, the data to be accessed according to the optimal data access processing solution and the access strategy; under the condition that decryption of the data to be accessed fails, determining that the industrial device with data to be accessed has no access authority, rejecting, by the data processing unit, the current data access request of the industrial device with data to be accessed, closing the temporary secure channel, and then completing the current data access processing; otherwise, transmitting, by the data processing unit, decrypted data to the industrial device with data to be accessed via the temporary secure channel, closing the temporary secure channel, and then completing the current data access processing;

step 11, under the condition that the implementation monitoring object is the industrial device with data to be accessed, proceeding to step 12; otherwise, proceeding to step 15;

step 12, assisting, by the data processing unit, the industrial device with data to be accessed to install the secure communication algorithm according to the optimal data access processing solution, and after installation is completed, establishing the temporary secure channel of the industrial device with data to be accessed according to the algorithm;

step 13, based on the optimal data access processing solution, assisting, by the data processing unit, the industrial device with data to be accessed to install a decryption facility suitable for the data to be accessed by means of the temporary secure channel; and then obtaining, by the data processing unit, the data to be accessed and the access strategy from the storage unit and the access control module of the data processing unit according to the data storage address bit and the access strategy retrieving address bit of the data upload authentication tag, respectively, and then transmitting the data to be accessed and the access strategy to the industrial device with data to be accessed via the temporary secure channel;

step 14, decrypting, by the industrial device with data to be accessed, the data to be accessed by means of the decryption facility; under the condition that the industrial device with data to be accessed successfully decrypts the data to be accessed, determining, by the data processing unit, that the industrial device with data to be accessed successfully accesses data, closing the temporary secure channel, and then completing the current data access processing; otherwise, determining that the industrial device with data to be accessed has no access authority, meanwhile, rejecting, by the data processing unit, the current data access request of the industrial device with data to be accessed, closing the temporary secure channel, and then completing the current data access processing;

step 15, selecting, by the data processing unit, qualified devices to form a cooperative computing device group according to the optimal data access processing solution and a specific condition of the industrial device in a device terminal candidate pool; and after the cooperative computing device group is successfully formed, assisting, by the data processing unit, the cooperative computing device group and the industrial device with data to be accessed to install the secure communication algorithm according to an optimal data processing solution, and after installation is completed, establishing the temporary secure channel of the cooperative computing device group and the industrial device with data to be accessed according to the algorithm;

step 16, based on the optimal data access processing solution, assisting, by the data processing unit, the cooperative computing device group to install the decryption facility suitable for the data to be accessed by means of the temporary secure channel; and then obtaining, by the data processing unit, the data to be accessed and the access strategy from the storage unit and the access control module of the data processing unit according to the data storage address bit and the access strategy retrieving address bit of the data upload authentication tag, respectively, and then transmitting the data to be accessed and the access strategy to the cooperative computing device group via the temporary secure channel; and step 17, decrypting, by the cooperative computing device group, the data to be accessed by means of the decryption facility according to the access strategy; under the condition that the cooperative computing device group successfully decrypts the data to be accessed, transmitting, by the cooperative computing device group, the decrypted data to the industrial device with data to be accessed via the temporary secure channel, specifically, determining, by the data processing unit, that the industrial device with data to be accessed successfully accesses data, closing the temporary secure channel, dismissing the cooperative computing device group, and then completing the current data access processing;

otherwise, determining that the industrial device with data to be accessed has no access authority, specifically, rejecting, by the data processing unit, the current data access request of the industrial device with data to be accessed, closing the temporary secure channel, dismissing the cooperative computing device group, and then completing the current data access processing.

2. The method according to claim 1, wherein the traceability unit is a ticket storage unit in the platform specially responsible for storing specific details of a historical data upload authentication tag and a historical optimal data upload solution.

3. The method according to claim 1, wherein the device identifier is a reliable industrial device identifier that is provided for the platform and is difficult to forge; and the device identifier at least comprises a device name, a device model, a device serial number, a device manufacturer, a production date, theoretical device computing capability, a device owner identity, a device owner name, and an actual device operation geographical position.

4. The method according to claim 1, wherein the data processing unit is a data processing center responsible for regulating and controlling various computing resources and solution resources in the platform and conducting access control and processing on various data in the platform; the data processing unit comprises the access control module, a data processing module, and a data desensitization module; the access control module is responsible for operating various access control functions and storing the access strategy; the data processing module is responsible for conducting various processing on data or coordinating various computing resources and solution resources in the platform so as to process data; and the data desensitization module is responsible for desensitizing all data to be uploaded that are uploaded to the data processing unit.

5. The method according to claim 4, wherein the data processing code is a data processing project implementation identifier that comprises NPR, EP, and EAP, wherein
the NPR identifies that before the data to be uploaded is uploaded to the storage unit of the platform, in addition to desensitization, no additional data processing operation needs to be conducted;
the EP identifies that before the data to be uploaded is uploaded to the storage unit of the platform, desensitization needs to be conducted, then encryption needs to be conducted under guidance of an optimal data upload solution, and finally the data processing unit uploads encrypted data to the storage unit of the platform; and
the EAP identifies that before the data to be uploaded is uploaded to the storage unit of the platform, desensitization needs to be conducted, then arithmetic processing and encryption need to be conducted on the data to be uploaded according to a data uploading request and an optimal data upload processing solution, and finally the data processing unit uploads processed data to the storage unit of the platform.

6. The method according to claim 4, wherein the cooperative computing device group is an industrial device set that is constructed by the data processing unit under the condition of satisfying the current actual operation condition of the platform and is used to assist the platform and an industrial device with data to be uploaded to complete implementation of the optimal data upload processing solution; the industrial device is a strong industrial device that is selected from the device terminal candidate pool of the platform by the sensor network on the basis of a current platform operation environment, a device condition of the industrial device with data to be uploaded, and content and difficulty of data upload processing, and the industrial device has certain computing capability, a reputation value reaching a threshold set by the platform, and relatively balanced load pressure, is located in a relatively safe and stable network environment, and is approved by an industrial device owner; and the device terminal candidate pool is a device set storing industrial devices that can serve as devices in the cooperative computing device group and then provides services for the platform.

7. The method according to claim 6, wherein the data upload authentication tag is a ticket certificate for recording basic information and processing details of the data to be uploaded; and the data upload authentication tag is composed of a tag head and a data storage part.

8. The method according to claim 6, wherein the reputation value is a measurement value for measuring whether an industrial device in the device terminal candidate pool has reliability in a platform entering period; and assuming that a device serial number of a certain industrial device in the device terminal candidate pool is i, a computation formula of a reputation value Credibility_value$_i$ of the device i is:

$$\text{Credibility\_value}_i = \varphi_1 \times \text{Contribute}_i + \varphi_2 \times \text{Stability\_index}_i + \varphi_3 \times \text{DEI}_i$$

wherein Credibility_value$_i \in (0,1)$; $\varphi_1 \in (0,1)$, $\varphi_2 \in (0,1)$, and $\varphi_3 \in (0,1)$ are weight factors, and $\varphi_1 + \varphi_2 + \varphi_3 = 1$; contribute$_i$ indicates a contribution value of the device i to the platform in an entering period; Stability_index$_i$ indicates a device stability value of the device i in the entering period; and DEI$_i$ indicates an evaluated index of the device i in the entering period;
a computation formula of the contribution value contribute$_i$ of the device i is:

$$\text{contribute}_i = \partial' \times \text{use}_i + \partial \times \text{cooperate}_i$$

wherein contribute$_i \in (0,1)$; use$_i$ in the contribute$_i$ indicates a condition that industrial production data uploaded by the device i is accepted and used by other industrial devices or users in the platform; cooperate$_i$ indicates a condition that the device i serves as one of devices in an auxiliary computing device group or the cooperative computing device group in the entering period and assists the platform to implement a corresponding task; and $\partial \in (0,1)$ and $\partial' \in (0,1)$ are weight factors, and $\partial + \partial' = 1$;
a computation formula of use$_i$ in the contribute$_i$ is:

$$\text{use}_i = \begin{cases} 0.5, & e = 0 \\ (1-\alpha) \times 0.5 + \alpha \times \dfrac{\sum_{j=1}^{e} \text{score}_j}{e}, & 0 < e < E \\ \dfrac{\sum_{j=1}^{e} \text{score}_j}{e}, & e > E \end{cases}$$

wherein use$_i \in (0,1)$; e in the use$_i$ indicates a total amount of industrial production data uploaded by the device i in the platform entering period; E is a quantity threshold; score$_j \in [0,1]$ indicates a ratio of jth industrial production data that is accepted by other industrial devices or users and has successful application feedback to the industrial production data having the total amount e; and $\alpha \in (0,1)$ is a weight factor; and
specifically, a computation formula of cooperate$_i$ in the contribute$_i$ is:

$$\text{cooperate}_i =
\begin{cases}
0.5 - (\text{total}_i - \text{success}_{totali}) \times 0.01 & 0 \leq \text{success}_{totali} < ST \\
0.5 \times \dfrac{\text{success}_{totali}}{\text{total}_i} + (\text{success}_{totali} \times 0.01) & ST \leq \text{success}_{totali} < ST_1 \\
\dfrac{\text{success}_{totali}}{\text{total}_i} & \text{success}_{totali} \geq ST_1
\end{cases}$$

wherein cooperate$_i \in (0,1]$; total$_i$ in the cooperate$_i$ indicates a total number of tasks that the device i serves as one of the devices in the auxiliary computing device group or cooperative computing device group to assist the platform to implement; success$_{totali}$ indicates the number of assistance tasks that the device i successfully completes; and ST and $ST_1$ are successful task quantity thresholds.

9. The method according to claim 8, wherein an identity value for measuring whether the device i is capable of stable implementation when processing various services arranged by the platform is defined as a device stability index Stability_index$_i$;

a computation formula of the device stability index Stability_index$_i$ of the device i is:

$$\text{Stability\_index}_i = \beta_1 \times NS_i + \beta_2 \times EH_i$$

wherein Stability_index$_i \in (0,1)$; $\beta_1 \in (0,1)$, $\beta_2 \in (0,1)$ is a weight factor, and $\beta_1 + \beta_2 = 1$; $NS_i$ indicates stability of a network environment where the device i is currently located in a large period of current reputation value evaluation; and $EH_i$ indicates a device health degree of the device i in the large period of current reputation value evaluation; and a computation formula of the $NS_i$ is:

$$NS_i = \begin{cases} 1, & ++ \\ 0.8, & + \\ 0.5, & \pm \\ 0.3, & - \\ 0, & \text{down} \end{cases}$$

wherein "++" indicates that a network where the device i is currently located is in an environment having a short network delay, a low packet loss rate, small network jitter and no network attack in the large period of current reputation value evaluation, and in this case, $NS_i=1$; "+" indicates that a network environment where the device i is currently located has no network attack in the large period of current reputation value evaluation but has a certain degree of network jitter and packet loss, which does not influence normal industrial production activities of the device i in the platform, and in this case, $NS_i=0.8$; "±" indicates that the network environment where the device i is currently located has no network attack in the large period of current reputation value evaluation but has serious network jitter and packet loss at a plurality of time points, which further influences the normal industrial production activities of the device i in the platform to a certain extent, and in this case, $NS_i=0.5$; "−" indicates that the network environment where the device i is currently located has no network attack in the large period of current reputation value evaluation but has continuous and serious network jitter and packet loss in a plurality of time periods, which causes the device i to be incapable of conducting the normal industrial production activities in the platform, and in this case, $NS_i=0.3$; "down" indicates that the device i suffers from network attacks in the large period of current reputation value evaluation, which further causes the device to be down and offline continuously or transmit malicious information endangering platform security to the platform so as to endanger the platform security, and in this case, $NS_i=0$; when $NS_i=0$, the device i is about to be removed from the device terminal candidate pool immediately, and in the entering period, the device i is no longer selected into the device terminal candidate pool;

a value of $EH_i \in (0,1)$ is obtained through comprehensive evaluation of actual operation and guarantee conditions of the device i by an owner of the device i, and in the entering period, the owner of the device i needs to upload the value $EH_i$ regularly in an uploading cycle specified by the platform, and update an old value $EH_i$ in time; and under the condition that uploading is not conducted in time, $EH_i=0$ in a current stage of a large period of reputation value evaluation, and the $EH_i$ can only be updated in a next stage of the large period of reputation value evaluation.

10. The method according to claim 1, wherein the sensor network is a data processing solution recommending unit that intelligently recommends the optimal data access processing solution suitable for the industrial device with data to be accessed to the data processing unit of the platform, wherein in an early stage of construction, a data access processing module of the sensor network incorporates a large number of knowledge maps of data access processing solutions constructed manually on the basis of a knowledge mapping technology, and under the condition that the data processing solution recommending unit is further combined, a data access processing solution is accurately recommended to the data processing unit according to the data access request, the device identifier, and the current actual operation condition of the platform; and meanwhile, data that is generated in a process of accessing the data to be accessed and can be used to update knowledge map structure data in the sensor network is also about to be updated to the sensor network in real time after access is completed, so as to ensure that the optimal data access processing solution recommended by the sensor network is more in line with a current actual data access scenario.

\* \* \* \* \*